United States Patent [19]
Abe

[11] Patent Number: 5,830,106
[45] Date of Patent: Nov. 3, 1998

[54] MALFUNCTION JUDGMENT SYSTEM OF OIL TEMPERATURE SENSOR FOR AUTOMATIC TRANSMISSION

[75] Inventor: Mitsutoshi Abe, Hiroshima-ken, Japan

[73] Assignee: Mazda Motor Corporation, Hiroshima-Ken, Japan

[21] Appl. No.: 872,227

[22] Filed: Jun. 10, 1997

[30] Foreign Application Priority Data

Jun. 11, 1996 [JP] Japan .................................... 8-172918
Jun. 11, 1996 [JP] Japan .................................... 8-172919

[51] Int. Cl.$^6$ .................................................. E16H 61/00
[52] U.S. Cl. ............................................. 477/98; 477/906
[58] Field of Search ....................................... 477/98, 906

[56] References Cited

U.S. PATENT DOCUMENTS 4,807,405  2/1989  Wallace .................................. 477/906
4,914,982  4/1990  Ito et al. ................................ 477/98
5,601,511  2/1997  Michioka ................................ 477/98

FOREIGN PATENT DOCUMENTS

07301315 A  11/1995  Japan .............................. F16H 61/00

*Primary Examiner*—Dirk Wright
*Attorney, Agent, or Firm*—Sidley & Austin; Hugh A. Abrams

[57] ABSTRACT

A malfunction judgment system of an oil temperature sensor for detecting a hydraulic oil temperature in an automatic transmission of a vehicle. The system receives an output from the oil temperature sensor to judge a malfunction of the oil temperature sensor when an increase rate of the oil temperature is smaller than a predetermined value in a predetermined time period after the vehicle starts running. A running condition detecting element detects a vehicle running condition. The system further has a plurality of conditions for judging the malfunction of the oil temperature sensor based on the detected running condition of the vehicle and the output of the oil temperature sensor.

23 Claims, 14 Drawing Sheets

MALFUNCTION JUDGMENT SYSTEM OF OIL TEMPERATURE SENSOR FOR AUTOMATIC TRANSMISSION

BACKGROUND OF THE INVENTION

1. Field of the Invention

The present invention relates to a malfunction judgment system for detecting a malfunction of an oil temperature sensor of an automatic transmission, in particular, a malfunction judgment system which is less sensitive in a smaller slip amount condition of a lock-up clutch of a torque converter.

2. Related Art

An automatic transmission of a vehicle is provided with a torque converter, shift gear mechanism having a plurality of clutches, brakes, control valve units for switching a power transmitting line, and the like. The torque converter transmits the power between a pump and turbine through a hydraulic oil which is sealed in a torque converter casing. The shift gear mechanism is also operated in a transmission oil sealed in a transmission case. In this case, as an oil temperature varies, the performance and the responsiveness of the transmission varies. In view of this, an oil temperature sensor is usually provided in the control valve unit for detecting a temperature of the hydraulic oil so as to reflect the oil temperature on the shift control of the automatic transmission. Thus, if the oil temperature sensor is malfunctioned, the shift control is deteriorated. In order to detect the malfunction of the oil temperature sensor, various technology is adopted.

As stated above, in the torque converter, the power is transmitted from the pump to the turbine through the hydraulic oil. In this case, the speed difference between the pump and the turbine is increased in a lower shift stage to thereby increase an oil temperature in the torque converter. On the other hand, in a higher shift stage, an oil temperature increase in the torque converter is not so increased as in the lower shift stage. However, the oil in the shift gear mechanism is increased in the higher shift stage due to a strong turbulence therein.

For example, a conventional malfunction judgment system for the oil temperature sensor detects the malfunction of the sensor where the temperature indication is not increased after running with a vehicle speed greater than a predetermined value, for example, 25–30 Km/h, for a predetermined time period. This kind of malfunction judgment system has a single predetermined vehicle speed and single predetermined time period for the judgment.

According to a Japanese unexamined patent application publication No. 7-301315 published in 1995, a cumulative time period for certain running conditions which causes an abnormal increase of the oil temperature (for example, a condition where the vehicle is in a D (drive) range, where the vehicle speed is more than 10 Km/h, where a throttle opening is more than ⅛, and where an engine speed is greater than about 450 rpm) is calculated. If the cumulative time period is greater than a predetermined value, a judgment is made that a malfunction of the oil temperature sensor occurs.

In the above conventional malfunction judgment system, the malfunction of the sensor is detected based on merely such a relatively lower speed running condition. However, there is a case where a vehicle runs in a coast condition just after starting, such as reduction speed running, down slope running, and the like, in which the engine road is lower than a no-load line. In these conditions, there occurs a substantial speed difference between the pump and turbine of the torque converter so that there is no substantial increase of the oil temperature in the torque converter. Thus, it would be difficult to property detect a malfunction of the oil temperature sensor deteriorating the accuracy and reliability in the malfunction judgment of the oil temperature malfunction. In addition, it is necessary for the malfunction judgment system as disclosed in the above Japanese publication to use many parameters in the malfunction judgment control. Because of this fact as well as the complicated calculation of the cumulative time period for the abnormal temperature increase, the above system is disadvantageous in that the control is complicated.

SUMMARY OF THE INVENTION

It is therefore an object of the present invention to provide a reliable and accurate malfunction judgment system for the oil temperature increase.

The above and other objects can be accomplished by a malfunction judgment system of an oil temperature sensor for detecting a hydraulic oil temperature filled in an automatic transmission of a vehicle comprising; malfunction judgment means for receiving an output of the oil temperature sensor to judge a malfunction of the oil temperature sensor where an increase rate of the oil temperature is smaller than a predetermined value in a predetermined period after the vehicle starts running, running condition detecting means for detecting a vehicle running condition, and; the malfunction judgment means being provided with a plurality of malfunction judgment conditions for judging the malfunction of the oil temperature sensor in accordance with the running condition of the vehicle.

In a preferred embodiment, the automatic transmission comprises a torque converter connected with a power source and a shift gear mechanism connected with the torque converter. The malfunction judgment system further comprises a lock-up clutch for directly connecting an input and output members of the torque converter, and lock-up control means for controlling an engagement of the lock-up clutch between a lock-up condition where the input member is engaged with the output member and a non lock-up condition where the input member is not engaged with the output member. The malfunction judgment conditions are preferably different between the lock up condition and the non lock-up condition. Specifically, the malfunction judgment means is less sensitive to hold the malfunction of the oil temperature judgment in the lock up condition than in the non-lock up condition.

In a preferred embodiment, the malfunction judgment means is provided with a plurality of malfunction judgment conditions in accordance with a slip amount between an input and output members of the torque converter. In this case, the malfunction judgment means become less sensitive to find the malfunction of the oil temperature sensor as the slip amount is reduced.

The malfunction judgment means is less sensitive to find the malfunction of the oil temperature in a coast condition in which the slip amount is smaller than a predetermined value. The coast condition can be a no load condition in which the power source drives no wheel of the vehicle. In this case, the malfunction judgment means is less sensitive in judging the malfunction of the oil temperature sensor when the no load condition is detected compared with a situation that the no load condition is not detected.

The malfunction judgment means may detect the coast condition based on the slip amount of the lock-up clutch. In another aspect, the malfunction judgment system further comprises an acceleration pedal for changing an engine load in accordance with its operation stroke, an idle switch which is turned on where the acceleration pedal is not operated. The malfunction judgment means detects the coast condition where a cumulative time period for which the idle switch has been kept on is greater than a predetermined value. The running condition detecting means detects the vehicle speed and the engine load. And, the malfunction judgment means detects the coast condition based on the vehicle speed and the engine load. Typically, the malfunction judgment means judges the malfunction of the oil temperature sensor based on an oil temperature increase of the automatic transmission after running for a predetermined period with a vehicle speed greater than a predetermined value.

The malfunction judgment means judges the malfunction of the oil temperature sensor based on the oil temperature increase after running for a predetermined time period with a vehicle speed, and the predetermined time period is increased in the coast condition.

The malfunction judgment means holds the malfunction of the oil temperature sensor when the temperature increase is not greater than a predetermined value after running for a predetermined time period with a vehicle speed greater than a predetermined vehicle speed. In this case, the predetermined value of the oil temperature increase being decreased in the coast condition.

The malfunction judgment means is prohibited to make a judgment of the malfunction of the oil temperature sensor in the coast condition. This is because an erroneous judgment of the malfunction of the oil temperature sensor might occur. Preferably, the system comprises informing means for informing a driver of the malfunction of the oil temperature sensor. Further, the system can comprises a storage which stores information of the malfunction of the oil temperature sensor. The malfunction judgment means holds the malfunction of the oil temperature sensor when the temperature increase as indicated is smaller than a predetermined value after running with a first predetermined vehicle speed for a first predetermined time period and after running with a second predetermined vehicle speed which is different from the first predetermined vehicle speed for a second predetermined time period which is deferent from the first predetermined time period.

In one embodiment, the first predetermined vehicle speed is determined to have a greater oil temperature increase in a shift gear mechanism than that in the torque convertor and the second predetermined vehicle speed is determined to have a greater oil temperature in the torque converter than in the shift gear mechanism. Preferably, the second predetermined time period is greater than the first predetermined time period. A timer for counting the second predetermined time period is reset when the first predetermined time period passes during the counting of the second predetermined time period. The oil temperature increase can be obtained after running with the first predetermined vehicle speed for the first predetermined time period and with the second predetermined vehicle speed for the second predetermined period. The malfunction judgment means starts to judge the malfunction of the oil temperature sensor a predetermined time period after the start of the power source, namely, the engine starts.

The predetermined time period may be determined based on an amount of the hydraulic oil in the automatic transmission.

Further objects, features and advantages of the present invention will become apparent from the Detailed Description of Preferred Embodiments which follows when read in light of the accompanying Figures.

BRIEF DESCRIPTION OF THE DRAWINGS

FIG. 2 is a time chart showing a relationship of a vehicle speed and flag values and the like;

DETAILED DESCRIPTION OF THE PREFERRED EMBODIMENTS

Hereinafter, the present invention is described in detail taking reference with the attached drawings. The illustrated embodiment is an example in which the present invention is applied to a malfunction judgment system for judging a malfunction of an oil temperature sensor for detecting a temperature of an oil loaded in an automatic transmission of a vehicle.

Figure 1:
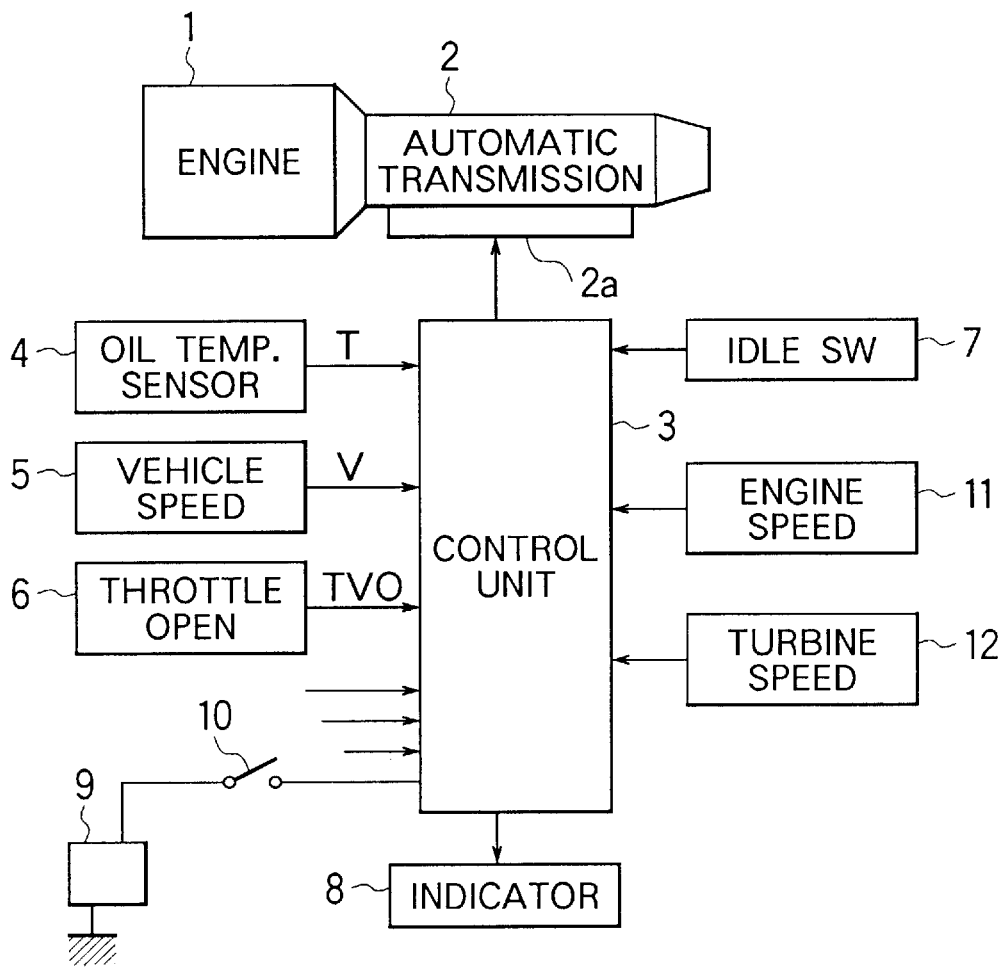
FIG. 1 is a schematic block chart of a malfunction judgment control system to which the present invention can be applied.

As shown in FIG. 1, an output shaft of an engine 1 is connected with an automatic transmission 2 of which output shaft is connected with a drive shaft so that an engine power is transmitted to drive wheels through the automatic transmission 2. The control unit 3 controls the automatic transmission as well as the malfunction judgment device of the oil sensor.

In a control valve unit 2a of the automatic transmission 2 are provided an oil sensor 4 for detecting an oil temperature T, a vehicle speed sensor for detecting a vehicle speed V based on a rotation speed of a drive shaft, and a throttle opening sensor 6 for sensing a throttle opening TVO of a throttle valve of the engine 1 which signals are entered to the control unit 3, and an idle switch 7 for detecting an entire close of the throttle valve. In addition, An indicator 8 including a liquid crystal display for informing a failure or malfunction of the oil sensor 4 is provided in an instrument panel of the vehicle. The control unit receives a power supply from a battery 9 through an ignition switch 8.

The control unit 3 is provided with an input-output interface, microcomputer, display controller for the indicator 8, a plurality of driver circuits for control valves and solenoids of the automatic transmission.

The micro computer, indicator 8 is provided with CPU, ROM and RAM. In the ROM are stored a control program according to the present invention in addition to a shift control program. The RAM includes memories for the shift control and malfunction information memories for a malfunction judgment control. In this case, RAM is backed up by a secondary battery and thus stored data therein are protected even when the ignition switch is turned off.

Hereinafter, there is described the malfunction judgment control.

Figure 2:
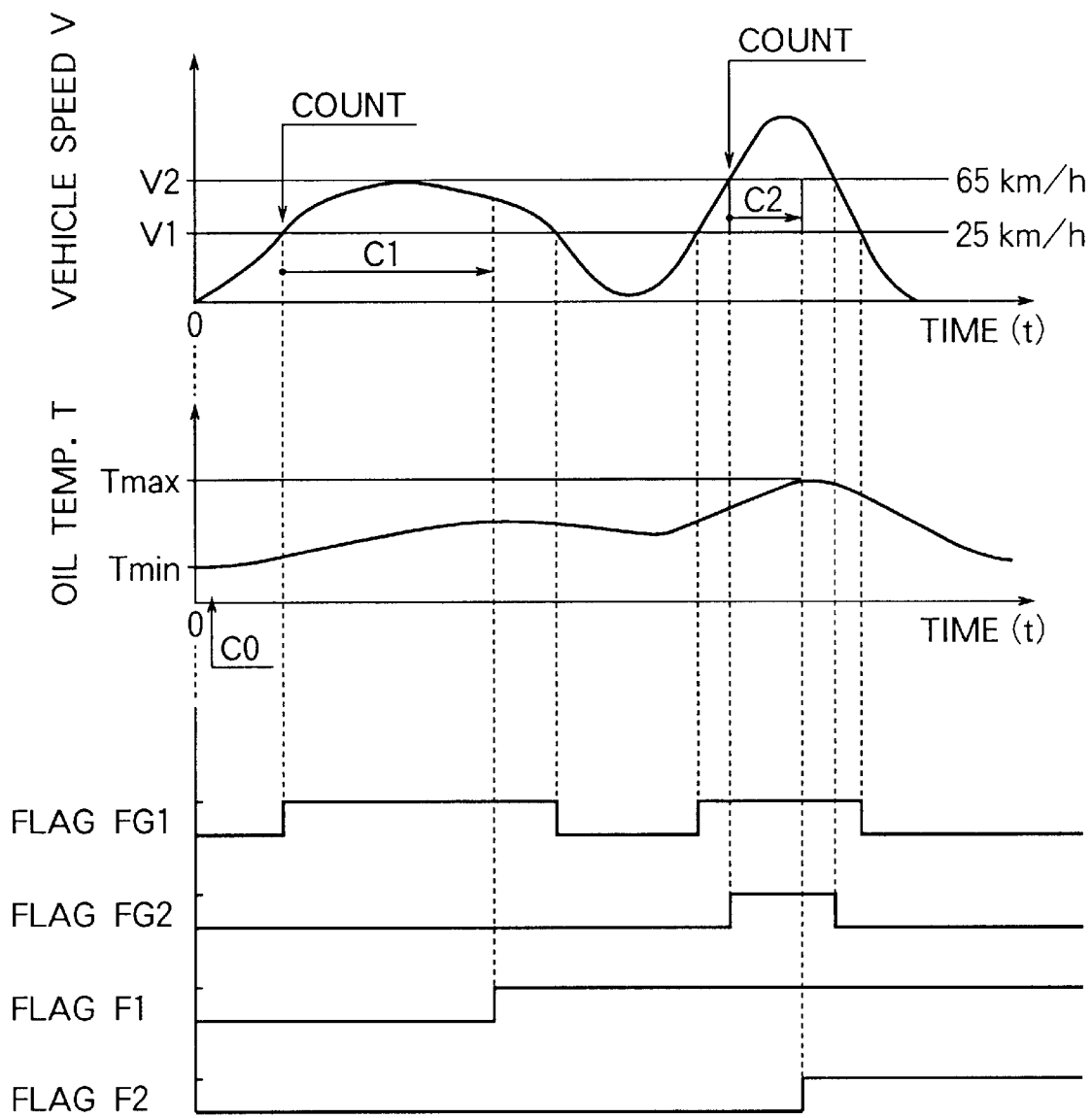

As shown in FIG. 2, when the ignition switch 8 is turned on to actuate the engine to thereby start running, the temperature of the oil in the automatic transmission 2 is increased. Where the oil sensor 4 works properly, the oil temperature detected is also increased. However, if the oil sensor 4 is malfunctioned for some reason, there would be no change in the indication of the oil temperature of the oil sensor 4 as the time goes on. According to the present invention, when a difference between the maximum value Tmax and minimum value Tmin of the oil temperature is not greater than a predetermined value in the case where the vehicle runs with a vehicle speed greater than a predetermined relatively lower value V1 (for example, 25 Km/h) for a predetermined time period C1 (for example 150 sec) and thereafter, runs with another vehicle speed greater than a predetermined relatively higher value V2 (for example, 60 Km/h) for a predetermined time period C2 (for example 100 sec), the malfunction judgment device holds that the oil sensor 4 is malfunctioned.

An oil temperature increase in the torque converter of the automatic transmission is greater than that in the shift gear mechanism thereof in the lower vehicle speed running condition whereas the oil temperature increase of the shift gear mechanism is greater than that of the torque converter in the higher vehicle speed running condition.

According to the illustrated malfunction judgment device, the malfunction judgment is made after the oil temperatures in both the torque converter and the shift gear mechanism are substantially increased.

In addition, where the cumulative time period of a coast condition, such as a speed reduction running, and down hill running and the like, for the time period C1 is greater than a predetermined time period or where the cumulative time period is greater than the predetermined time period C2, the malfunction judgment is prohibited. Meanwhile, in case of the running condition as illustrated on FIG. 3, the vehicle reaches quickly the higher vehicle speed running condition on starting. Therefore, time counts for both the lower and the higher vehicle speed running conditions are concurrently performed. If the time count for the lower vehicle speed running condition is completed, a time counter for the higher vehicle speed running condition is reset. Similarly, when the time count for the higher vehicle speed running condition is completed, the time counter for the lower vehicle speed running condition is reset. Thus, the accuracy and reliability for the malfunction judgment can be established.

Next, a malfunction judgment control routine will be explained taking reference with a flow chart in which reference Si (i=1, 2, 3, - - - ) shows a step of the routine.

Other references denote as follows;

Timer TM - - - count down timer

FF - - - fail flag (0 in a normal condition of the oil sensor, 1 in a malfunction condition)

FG1 - - - flag denoting vehicle speed V≧ the predetermined vehicle speed V1

FG2 - - - flag denoting vehicle speed V≧ the predetermined vehicle speed V2

F1 - - - admission flag denoting that the vehicle runs with a vehicle speed greater than the predetermined vehicle speed V1 for the predetermined time period C1

F2 - - - admission flag denoting that the vehicle runs with a vehicle speed greater than the predetermined vehicle speed V1 for the predetermined time period C1

C1 - - - count down timer

CD2 - - - count down timer

V - - - vehicle speed detected by the vehicle speed sensor 5

T - - - oil temperature detected by the oil sensor 4

Tmax - - - maximum value of the oil temperature detected

Tmin - - - minimum value of the oil temperature detected

CN1 - - - counter for counting a cumulative time period of the coast condition in case of the vehicle speed V≧ a predetermined vehicle speed V1

CN2 - - - counter for counting a cumulative time period of the coast condition in case of the vehicle speed V≧ a predetermined vehicle speed V2.

Figure 3:
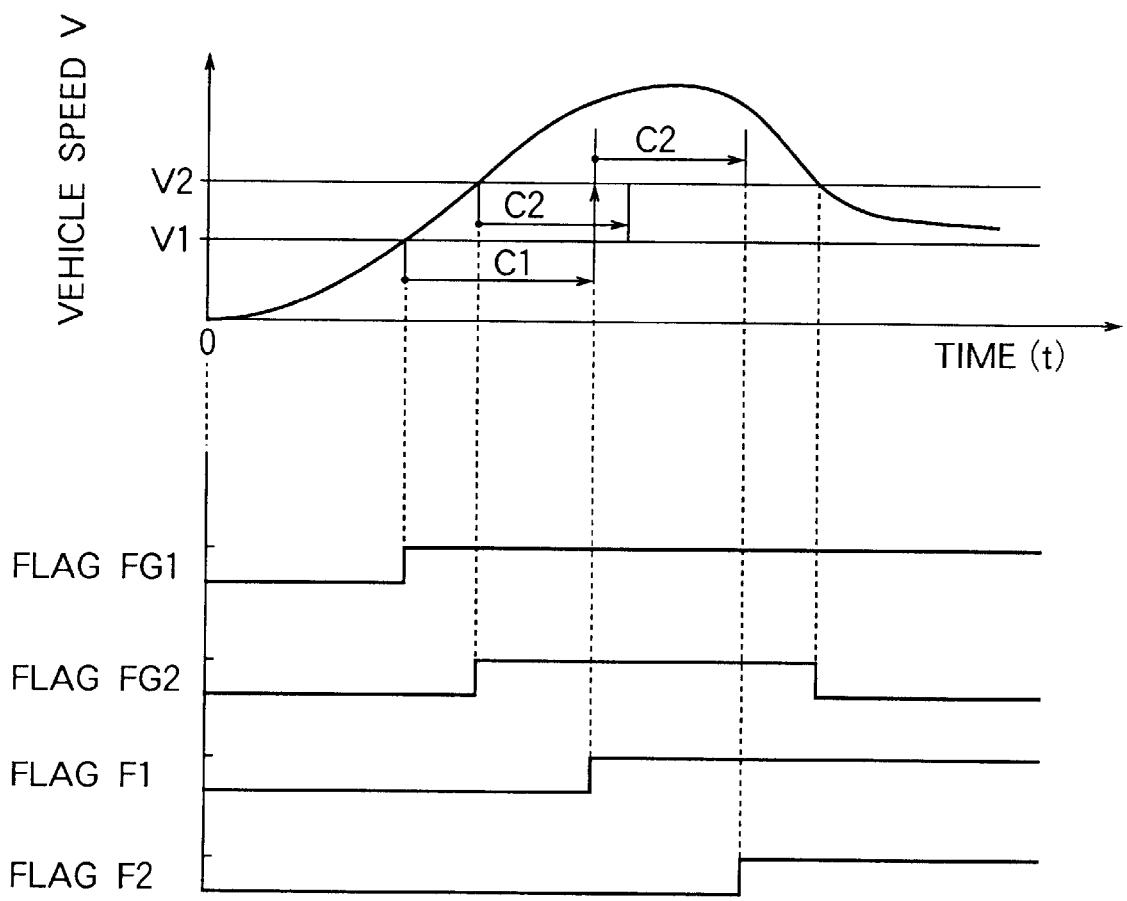
FIG. 3 is another time chart similar to the FIG. 2.
Figure 4:
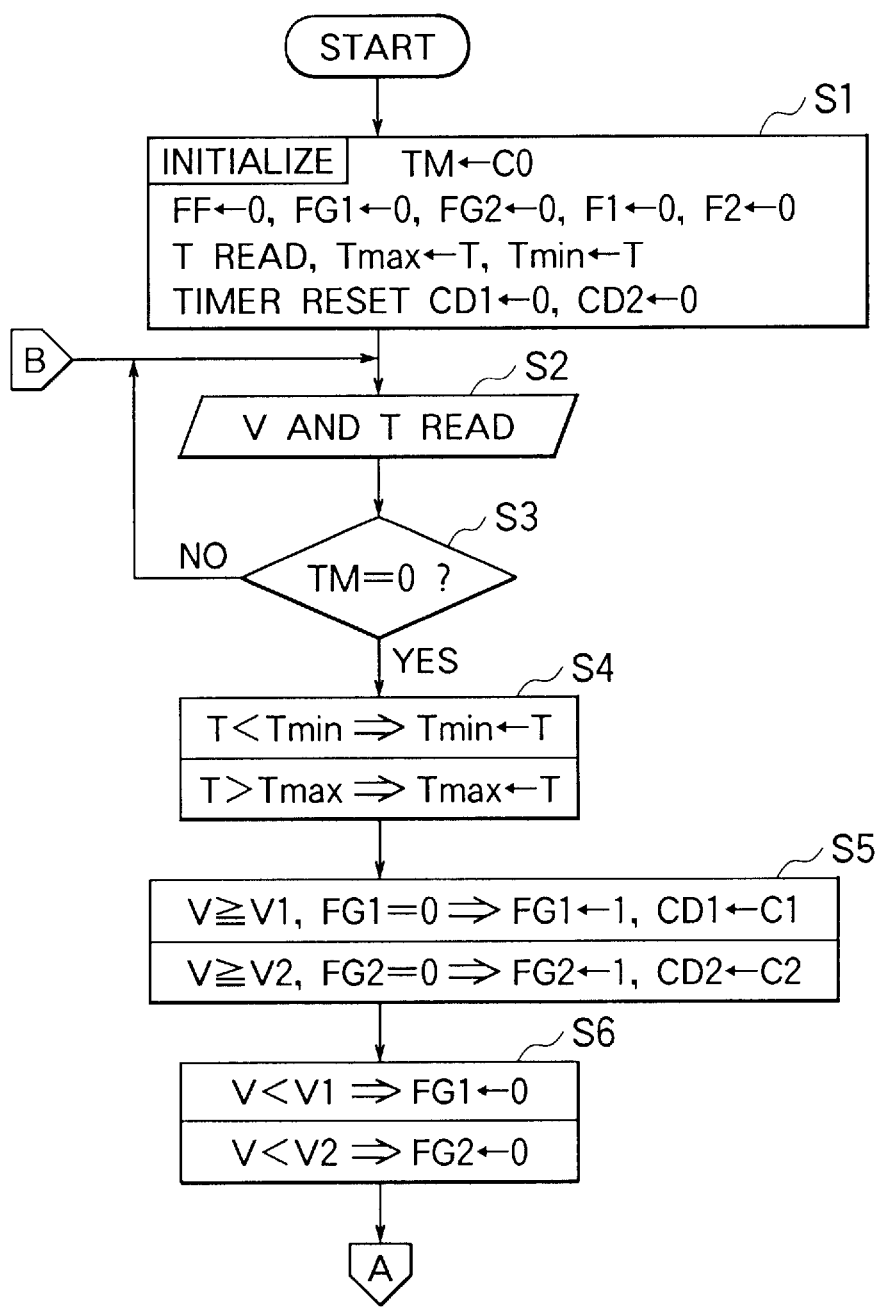
FIG. 4 is a flow chart of a malfunction judgement control in accordance with the present invention.
Figure 5:
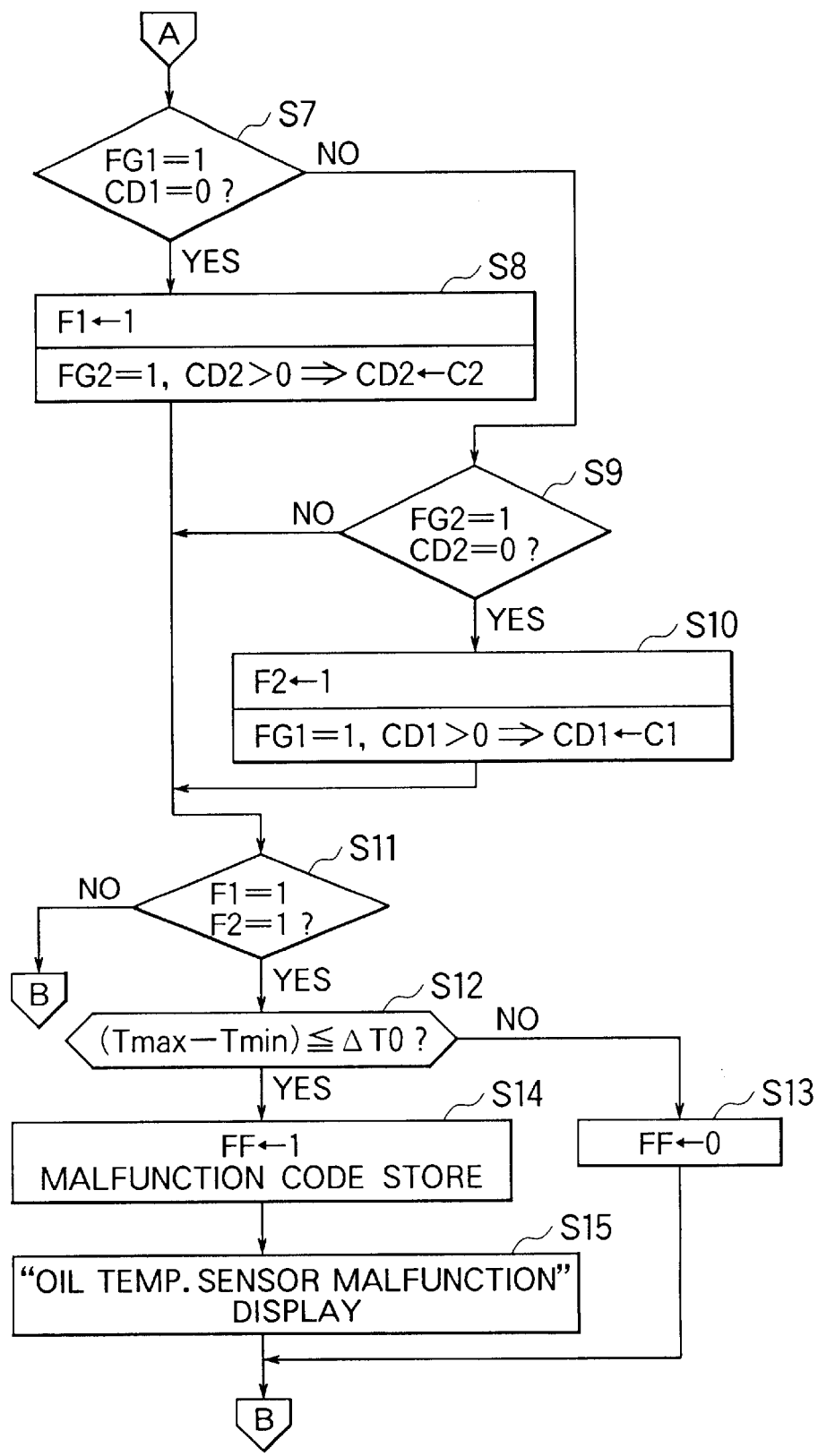
FIG. 5 is a flow chart of a malfunction judgment control continued from FIG. 4 in accordance with the present invention.
Figure 6:
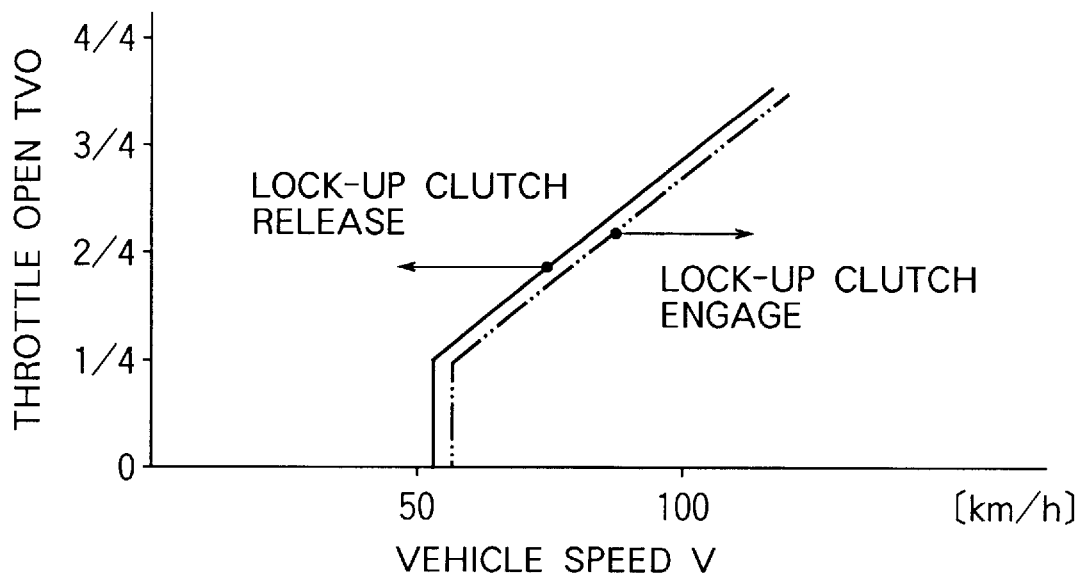
FIG. 6 is a graphical presentation of a map showing a lock-up area.

The malfunction judgment is explained taking reference with FIGS. 3 and 4. As the ignition switch 10 is turned on to start the control, initial setting is first performed (S1). In this step, an initial value C0 (for example, 180 sec) is set and the timer TM is started and all the flags FF, FG1, FG2, F1 and F2 are reset. Then, the oil temperature T detected is read in and the maximum oil temperature Tmax and minimum oil temperature Tmin is set. The timers CD1 and CD2 are cleared. Next, the vehicle speed V detected by the vehicle speed sensor V and the oil temperature T detected by the oil temperature sensor 4 are read in (S2), it is judged whether or not the time period C0 set for the timer TM has passed (S3). The value C0 is a time period such that an oil circulates in the oil cooler and the automatic transmission 2 to have substantial the same temperature therein. The time period C0 is determined based on an amount of the oil loaded in the automatic transmission (for example, 6 liter) and flow rate of the oil in the oil cooler (5 liter). When the judgement in the step S3 is No, the steps S2 and S3 are repeated. However, if the judgment in the step S3 is turned Yes, the minimum oil temperature Tmin and the maximum oil temperature Tmax are renewed if necessary in step S4. Namely, the oil temperature T is smaller than the minimum value Tmin, the minimum value Tmin is replaced by the oil temperature T. When the oil temperature T is greater than the maximum value Tmax, the value Tmax is replaced by the oil temperature T. Next, in step S5, where the vehicle speed V is not smaller than the value V1 and where the flag FG1=0, the flag FG1 is set and the timer CD1 is set at a predetermined value C1 and started counting. Similarly, where he vehicle speed V is not smaller than the value V2 and where the flag FG2=0, the flag FG2 is set and the timer CD2 is set at a predetermined value C2 and the counting thereof starts.

In step S6, where the vehicle speed V is smaller than the value V1, the flag FG1 is reset. Similarly, where the value V is smaller then the value V2, the flag FG2 is reset. Next, in step S7, it is judged whether or not FG1=1 and the time count for the timer CD1 is completed. In case of Yes in the judgment of step S7, the judgment admission flag F1 is set in step S8. Where the flag FG2=1 and time count of the timer CD1 is not completed, the timer CD2 is set at a predetermined value CD2 and started again. Then, the procedure is transferred to a step S11. On the other hand, if the judgment in the step S7 is No, it is judged whether or not the flag FG2=1 and the time count of the timer CD2 is completed in step S9. If the judgment in step S9 is Yes, the judgment admission flag F2 is set in step S10. Where the flag FG1=1 and the time count of the timer CD1 is not completed, the predetermined time C1 is set for the timer CD1 and started again and the step S11 is executed. Where the judgment in step S9 is No, the procedure is transferred to the step S11.

Next, in step S11, it is judged whether or not both the flag F1 and F2 are "1". If the judgment is No, the procedure is returned to the step S2 and then the procedures from the step S2 to step S11 is repeated as stated above. On the other hand, if the judgment is turned to Yes while repeating the steps S2–S11, then, it is judged whether or not the difference between the maximum value Tmax and the minimum value Tmin is not greater than a predetermined value ΔTO (for example 2° C.) in step S12. Where the oil sensor works properly, the oil temperature is gradually increased to increase the difference (Tmax−Tmin). However, if the oil sensor 4 is malfunctioned, the indication of the oil temperature is not changed to be the difference (Tmax−Tmin)≦ the predetermined value ΔT0.

Thus, where the judgment in step S12 is No, the oil sensor 4 is normal so that the fail flag FF is reset in step S13 and the procedure is returned to the step S2 and repeated. Where the judgment in step S12 is Yes, the fail safe flag FF is set in step S14 and a malfunction code for indicating the malfunction of the oil temperature sensor is stored in the malfunction information memory of RAM. Next, "malfunction of the oil temperature sensor" is displayed in the indicator 8 to inform the driver of the malfunction of the oil temperature sensor 4. Then, the procedure is returned to step S2 and repeated. Meanwhile, the malfunction judgment control is continued until the ignition switch is turned off. However, if the oil temperature sensor 4 is malfunctioned, the step S15 may be repeated without returning to the step S2.

Meanwhile, the malfunction code stored in the malfunction information memory is used for the shift control of the automatic transmission 2.

In operation, the control unit 3 sets the lower predetermined vehicle speed V1 and the higher predetermined vehicle speed V2. Certain temperature increases in the oil is produced when the vehicle runs with a vehicle speed greater than the predetermined value V1 for more than the predetermined time period C1 and when the vehicle runs with greater than the predetermined value V2 for more than the predetermined time period C2 respectively.

According to the present invention, the malfunction judgment of the oil temperature sensor 4 is made based on the oil temperature increased both in the torque converter and the shift gear mechanism. Even though a running pattern is unusual in the beginning of the run, a certain oil temperature increase is produced at least in either the torque converter or the shift gear mechanism. According to the present invention, the malfunction judgment is made based on the oil temperature increase in either of the torque converter or the shift gear mechanism so that an accurate and reliable malfunction judgment is accomplished.

The oil temperature increase in the torque converter under the lower vehicle speed condition is smaller than that in the shift gear mechanism under the higher vehicle speed condition. In view of this, the time period C1 is set greater than the time period C2 to improve the reliability and accuracy of the malfunction judgment.

As shown in steps S7–S10, when either one of the time period C1 or C2 is counted out, the other is reset and counted again. As clearly shown in FIG. 3, a higher vehicle speed condition is established quickly on starting, the time periods C1 and C2 are concurrently counted. In this case, the oil temperature increase is relatively small compared with a running condition where the time periods C1 and C2 are not concurrently counted. Therefore, the accuracy and reliability can be obtained by resetting and counting again the other again when one of the time periods C1 and C2 is counted out. In another aspect, the timer TM is provided so that the malfunction judgment is not made until the predetermined time period C0 passes after the engine starts. It is considered that the oil temperature after the engine starts is homogenized after a circulation of the automatic transmission 2 and the oil cooler and that the time period therefor is proportional to the oil amount in the automatic transmission. The time period C0 is enough to cover such time period. In the case where the oil temperature sensor is malfunctioned, the malfunction is displayed on the indicator 8 so as to inform to the driver so that the failed oil temperature sensor 4 can be properly amended. In addition, there is a malfunction information memory backed up by the secondary battery for storing the malfunction code so that the malfunction information can be used for indicating the malfunction of the oil temperature sensor 4 and for adjusting the shift control.

Hereinafter, there is described another embodiment of the malfunction judgment control.

In this embodiment, the plurality of malfunction judgment conditions are provided corresponding to a plurality of different running conditions.

As examples of the different running conditions, a lock-up condition where the lock-up clutch is engaged and a non lock-up condition where the lock-up clutch is not engaged are chosen. A shift control map for controlling the automatic transmission includes a lock-up engaging line and a lock-up releasing line. In order to make the lock-up control taking account of the lock-up engaging zone and the lock-up releasing zone, the oil temperature, vehicle speed V and throttle opening TVO detected by the throttle opening sensor 6 are employed. Thus, the oil temperature is important for the lock-up control.

Figure 7:
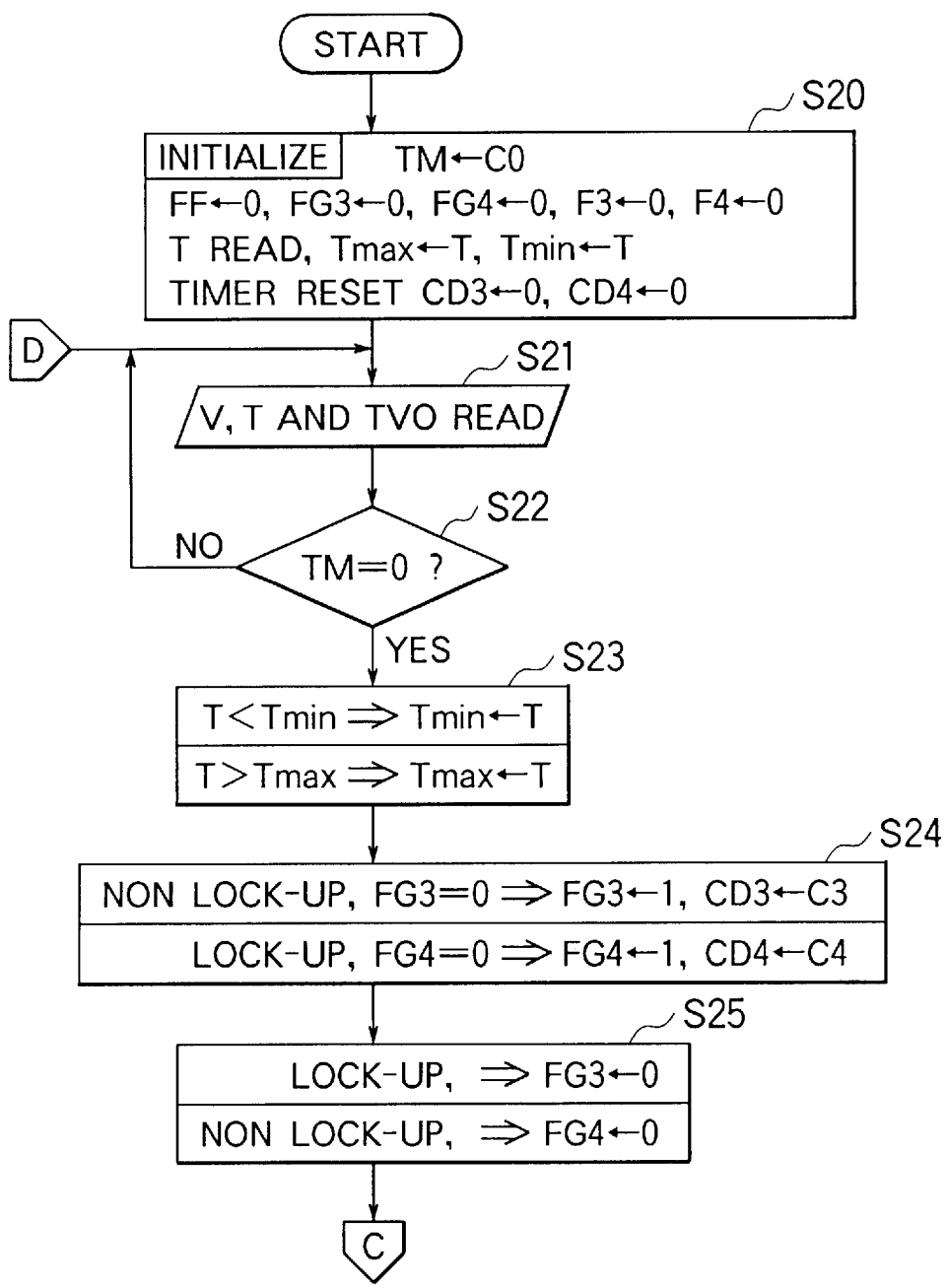
FIG. 7 is a flow chart of a malfunction judgment control in accordance with another preferred embodiment of the present invention.
Figure 8:
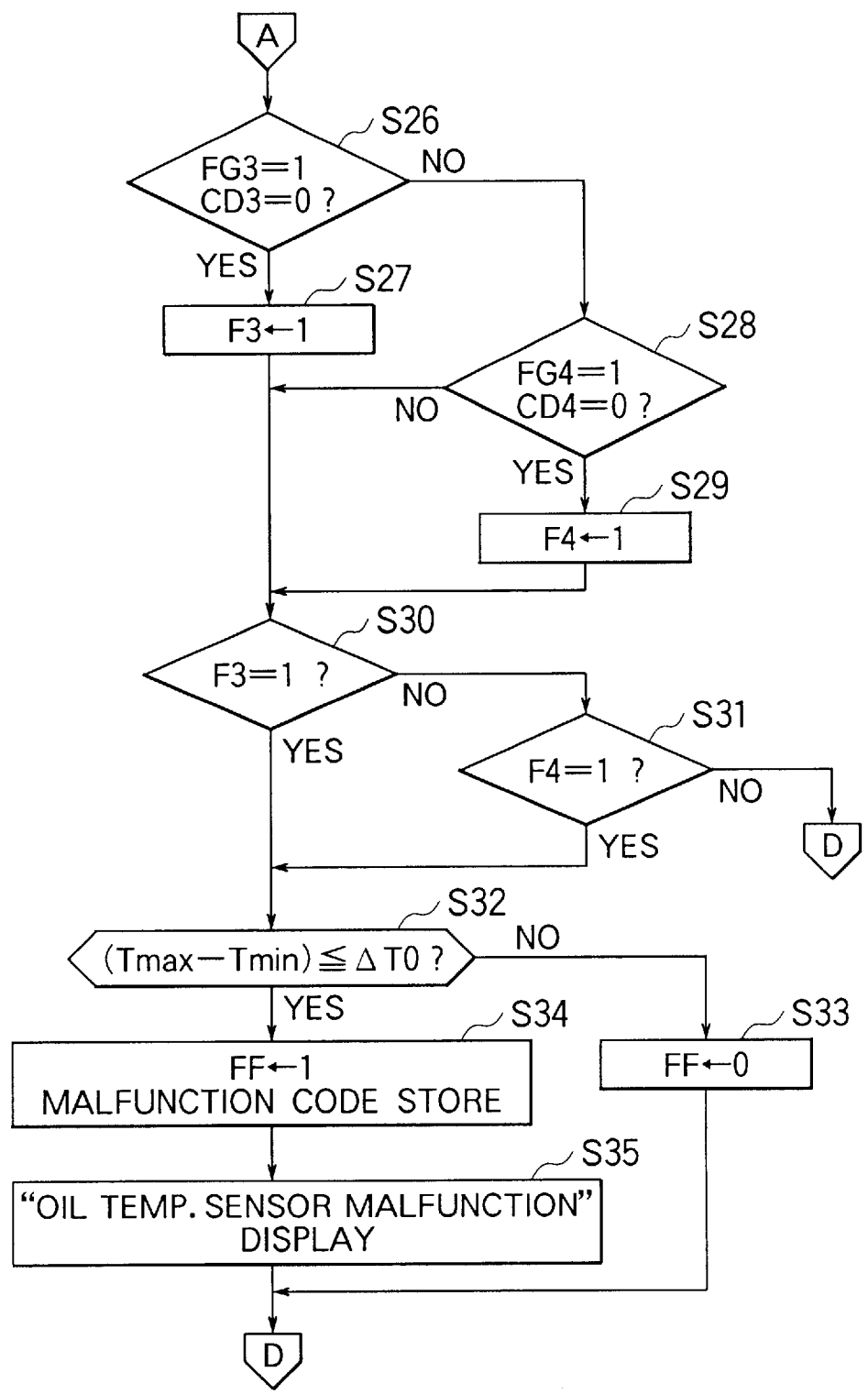
FIG. 8 is a flow chart continued from FIG. 7.

Hereinafter, the malfunction judgment control is explained taking reference with FIGS. 7 and 8.

As the ignition switch 10 is turned on to start the control, initial setting is first performed (S20). In this step, an initial value C0 (for example, 180 sec) is set and the timer TM is started and all the flags FF, FG3, FG4, F3 and F4 are reset. Then, the oil temperature T detected is read in and the maximum oil temperature Tmax and minimum oil temperature Tmin is set. The timers CD3 and CD4 are cleared. Next, the vehicle speed V detected by the vehicle speed sensor V and the oil temperature T detected by the oil temperature sensor 4 are read in (S21), it is judged whether or not the time period C0 set for the timer TM has passed (S22).

When the judgement in the step S22 is No, the steps S21 and S22 are repeated. However, if the judgment in the step S22 is turned Yes, the minimum oil temperature Tmin and the maximum oil temperature Tmax are renewed if necessary in step S4. Namely, the oil temperature T is smaller than the minimum value Tmin, the minimum value Tmin is replaced by the oil temperature T. When the oil temperature T is greater than the maximum value Tmax, the value Tmax is replaced by the oil temperature T. Next, in step S24, in case of the flag FG1=0 in the non lock-up condition, the flag FG3 is set and the timer CD3 is set at a predetermined value C3 and started counting. Similarly, in case of the flag FG4=0 in the lock-up condition, the flag FG4 is set and the timer CD4 is set at a predetermined value C4 and started counting.

Next, in step S25, the flag FG3 is reset in the lock-up condition. Similarly, the flag FG4 is reset in the non lock-up condition. Next, in step S27, it is judged whether or not FG3=1 and the time count for the timer CD3 is completed. In case of Yes in the judgment of step S26, the judgment admission flag F3 is set in step S27. Thereafter, the step S30 is executed. On the other hand, where the judgment in step S26 is No, it is judged whether or not the timer CD4 is counted out and the flag FG4=1 in step S28. Where the judgment in step S28 is Yes, the admission flag F4 is set and the procedure is forwarded to the step S30. Where the judgment in step S28 is No, the procedure is transferred to the step S30 as well.

Next, in step S30, it is judged whether or not the flag F3 is "1". If the judgment is Yes, the procedure is forwarded to the step S32. On the other hand, the judgment is No, it is judged whether or not the flag F3 is "1". If the judgment is Yes, the step S32 is executed. If No, the procedure is returned to the step S21 and repeated.

In step S32, it is judged whether or not the difference between the maximum value Tmax and the minimum value is not greater than a predetermined value $\Delta T0$ (for example 2° C.) in step S32. Where the oil temperature sensor works properly, the oil temperature is gradually increased to increase the difference (Tmax−Tmin). However, if the oil temperature sensor 4 is malfunctioned, the indication of the oil temperature is not changed to be the difference (Tmax−Tmin)$\leq$ the predetermined value $\Delta T0$.

Thus, where the judgment in step S32 is No, the oil temperature sensor 4 is normal so that the fail flag FF is reset in step S33 and the procedure is returned to the step S21 and repeated. Where the judgment in step S32 is Yes, the fail safe flag FF is set in step S34 and a malfunction code for indicating the malfunction of the oil temperature sensor is stored in the malfunction information memory of RAM. Next, "malfunction of the oil temperature sensor" is displayed in the indicator 8 to inform the driver of the malfunction of the oil temperature sensor 4. Then, the procedure is returned to step S21 and repeated. Meanwhile, the malfunction judgment control is continued until the ignition switch is turned off. However, if the oil temperature sensor 4 is malfunctioned, the step S35 may be repeated without returning to the steps 21.

In the illustrated malfunction judgment control, the flag F3 is set when the vehicle runs in the non-lock-up condition for the predetermined time period C3. The flag F4 is set when the vehicle runs in the lock-up condition for the predetermined time period C4. Meanwhile, the value C3 is smaller than the value C4 since the oil temperature increase of the torque converter in the non lock-up control is greater than that in the lock-up condition. Where the flag F3 or F4 is set, the malfunction is judged through the judgment in step S32. As aforementioned, the malfunction of the oil temperature sensor 4 is judged in accordance with the running condition to improve the accuracy and the reliability of the malfunction judgment.

The following modifications may be made.

1) An indicator lamp is provided in replace of the indicator 8 on the instrument panel so as to light on when the oil temperature sensor is malfunctioned.

2) The present invention can be properly applied to detect the malfunction of the oil temperature sensor of various types of the automatic transmissions.

3) The control unit can be separated from the control system of the automatic transmission to mainly control the malfunction judgment of the oil temperature control.

4) Discrimination data other than the shift control map may be employed to discriminate the lock-up zone and non lock-up zone.

Figure 9:
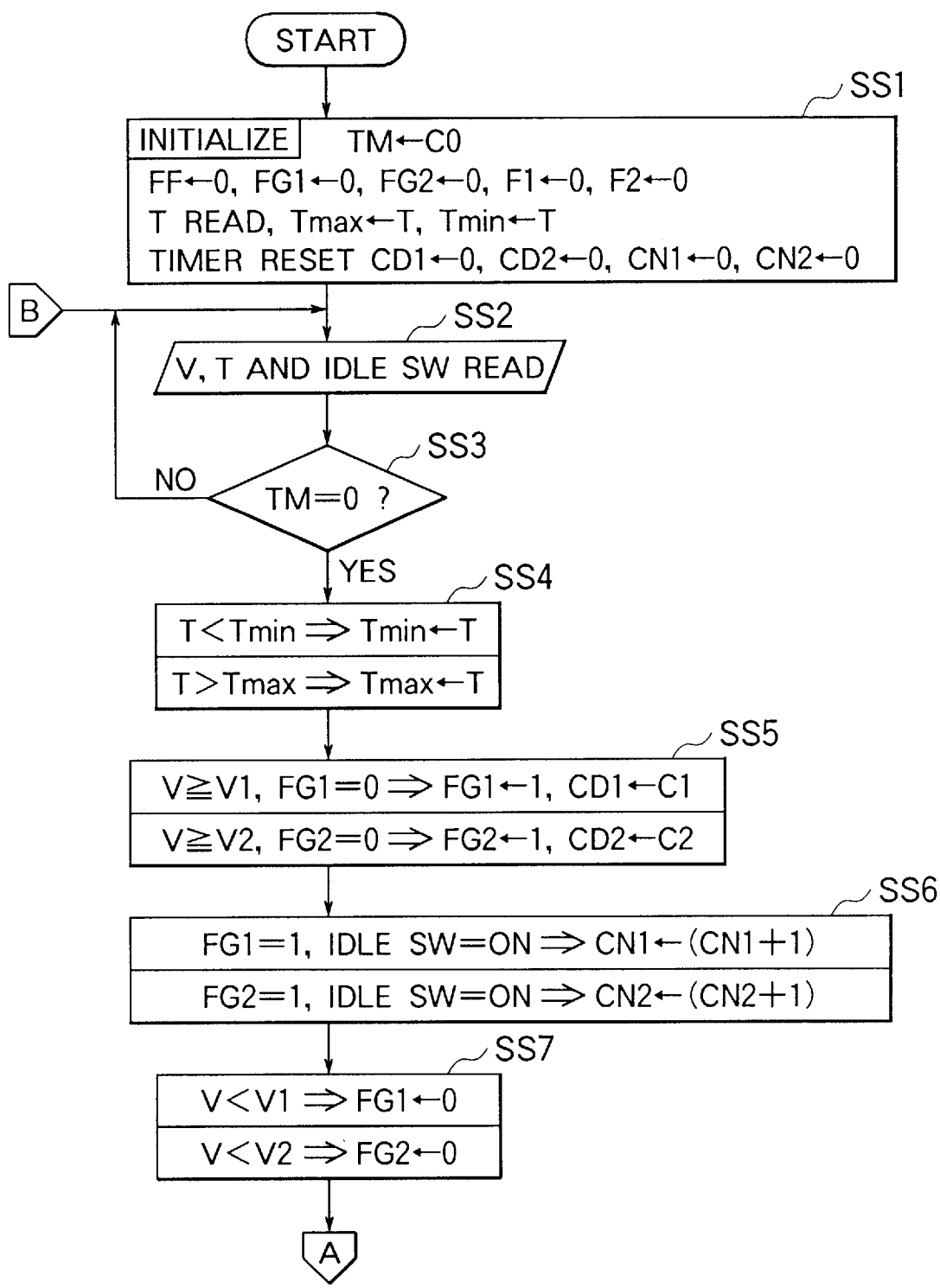
FIG. 9 is a flow chart of a malfunction judgment control in accordance with further preferred embodiment of the present invention.
Figure 10:
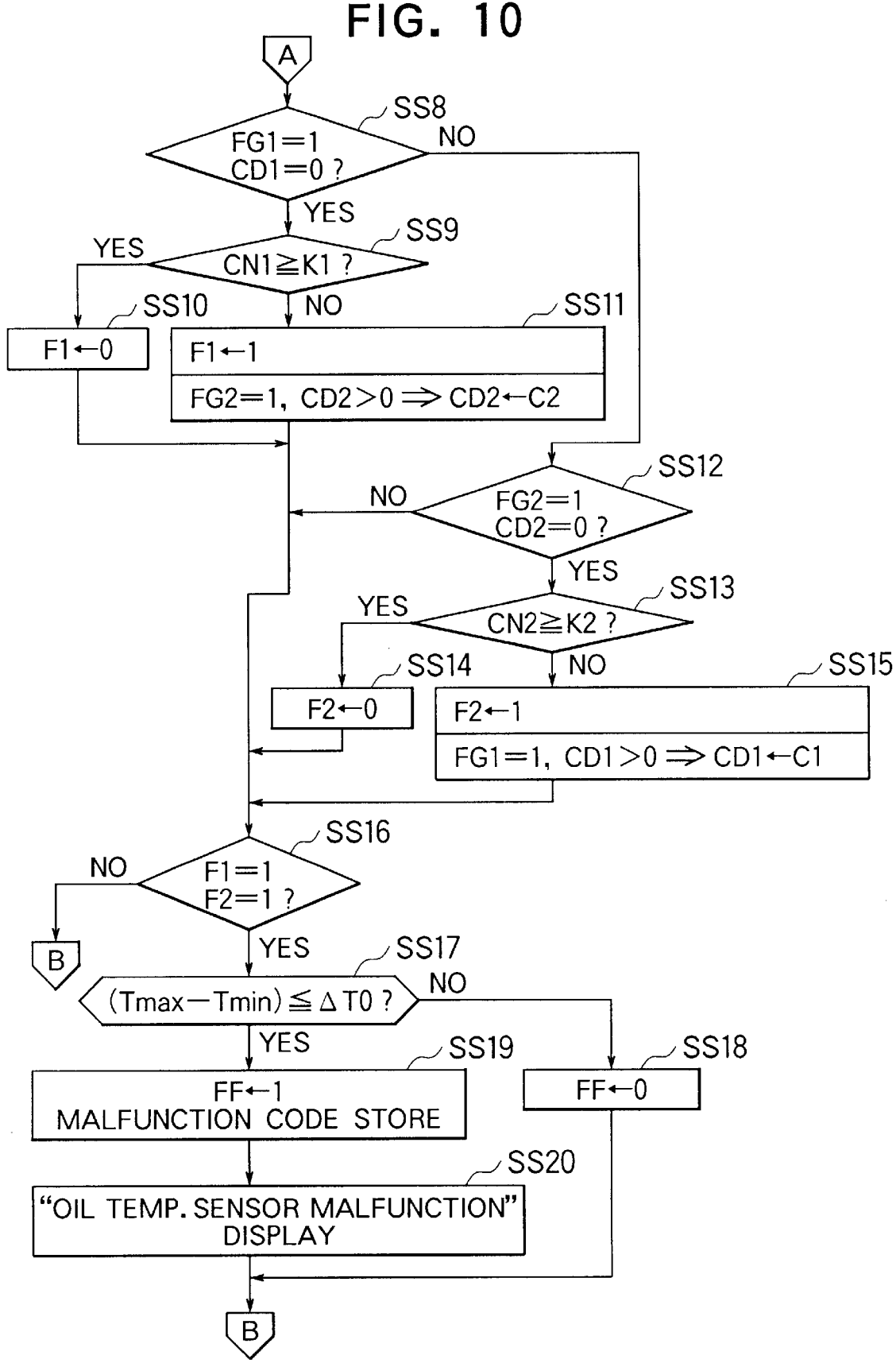
FIG. 10 is a flow chart continued from FIG. 9.

The malfunction judgment is explained taking reference with FIGS. 9 and 10. As the ignition switch 10 is turned on to start the control, initial setting is first performed (SS1). In this step, an initial value C0 (for example, 180 sec) is set and the timer TM is started and all the flags FF, FG1, FG2, F1 and F2 are reset. Then, the oil temperature T detected is read in and the maximum oil temperature Tmax and minimum oil temperature Tmin is set at the detected temperature T. Then, the timers CD1 and CD2 are cleared. The counters CN1 and CN2 are also cleared.

Next, the vehicle speed V detected by the vehicle speed sensor V, the oil temperature T detected by the oil temperature sensor 4 and an idle switch signal are read in (SS2), it is judged whether or not the time period C0 set for the timer TM has passed (SS3). The value C0 is a time period such that an oil circulates in the oil cooler and the automatic transmission 2 to have substantial the same temperature therein. The time period C0 is determined based on an amount of the oil loaded in the automatic transmission (for example, 6 liter) and flow rate of the oil in the oil cooler (5 liter). When the judgement in the step SS3 is No, the steps SS2 and SS3 are repeated. However, if the judgment in the step SS3 is turned Yes, the minimum oil temperature Tmin and the maximum oil temperature Tmax are renewed if necessary in step SS4. Namely, the oil temperature T is smaller than the minimum value Tmin, the minimum value Tmin is replaced by the oil temperature T. When the oil temperature T is greater than the maximum value Tmax, the value Tmax is replaced by the oil temperature T. Next, in step SS5, where the vehicle speed V is not smaller than the value V1 and where the flag FG1=0, the flag FG1 is set and the timer CD1 is set at a predetermined value C1 and started counting. Similarly, where the vehicle speed V is not smaller than the value V2 and where the flag FG2=0, the flag FG2 is set and the timer CD2 is set at a predetermined value C2 and started counting.

In step SS6, in case of FG1=1 and where the idle switch 7 is ON, the counter CN1 is incremented by one. In case of FG2=1 and where the idle switch is ON, the counter CN2 is incremented by one.

Next, in step SS7, where the vehicle speed V is smaller than the value V1, the flag FG1 is reset. Similarly, where value V is smaller then the value V2, the flag FG2 is reset. Next, in step SS8, it is judged whether or not FG1=1 and the time count for the timer CD1 is completed. In case of Yes in the judgment of step SS8, it is judged whether or not the counter CN1 is not smaller than a predetermined value K1 (for example, K1 is equivalent to 30 seconds). If the judgment in SS9 is Yes, the judgment admission flag F1 for prohibiting the malfunction judgment of the oil temperature sensor is reset in step SS10 then procedure is returned to the step S2.

If the judgment in SS9 is No, the judgment admission flag F1 is set in SS11. Where the flag FG2=1 and time count of the timer CD1 is not completed, the timer CD2 is set at a predetermined value CD2 and started again. Then, the procedure is transferred to a step SS16. On the other hand, if the judgment in the step SS8 is No, it is judged whether or not the flag FG2=1 and the time count of the timer CD2 is completed in step SS12. If the judgment in step SS12 is Yes, it is judged whether or not the counter CN2 is not smaller than a predetermined value K2 (for example, the value K2 is equivalent to 20 seconds). If the judgment in SS13 is Yes, the judgment admission flag F2 for prohibiting the malfunction judgment of the oil temperature sensor is reset in step SS14 then procedure is returned to the step SS2. If the judgment in the step SS13 is No, the judgment admission flag F2 is set in step SS15. Where the flag FG1=1 and the time count of the timer CD1 is not completed, the predetermined time C1 is set for the timer CD1 and started again and the step SS16 is executed.

Next, in step SS16, it is judged whether or not both the flag F1 and F2 are "1". If the judgment is No, the procedure is returned to the step SS2 and then the procedures from the step SS2 to step SS16 is repeated as stated above. On the other hand, if the judgment is turned to Yes while repeating the steps SS2 to SS16, then, it is judged whether or not the difference between the maximum value Tmax and the minimum value is not greater than a predetermined value $\Delta T0$ (for example 5° C.) in step SS17. Where the oil temperature sensor works properly, the indication of the oil temperature is gradually increased to increase the difference (Tmax−Tmin). However, if the oil temperature sensor 4 is malfunctioned, the indication of the oil temperature is not changed to be the difference (Tmax−Tmin)≦ the predetermined value $\Delta T0$.

Thus, where the judgment in step SS17 is No, the oil temperature sensor 4 is normal so that the fail flag FF is reset in step SS19 and the procedure is returned to the step SS2 and repeated. Where the judgment in step SS17 is Yes, the fail safe flag FF is set in step SS19 and a malfunction code for indicating the malfunction of the oil temperature sensor is stored in the malfunction information memory of RAM. Next, "Malfunction of the oil temperature sensor" is displayed in the indicator 8 to inform the driver of the malfunction of the oil temperature sensor 4. Then, the procedure is returned to step SS2 and repeated. Meanwhile, the malfunction judgment control is continued until the ignition switch is turned off. However, if the oil temperature sensor 4 is malfunctioned, the step SS20 may be repeated without returning to the step SS2. In this case, the malfunction judgment control is an interrupt routine and is executed with a predetermined interval.

Meanwhile, the malfunction code stored in the malfunction information memory is used for the shift control of the automatic transmission 2.

In operation, the control unit 3 sets the lower predetermined vehicle speed V1 and the higher predetermined vehicle speed V2. Certain temperature increases in the oil is produced when the vehicle runs with a vehicle speed greater than the predetermined value V1 for more than the predetermined time period C1 and when the vehicle runs with greater than the predetermined value V2 for more than the predetermined time period C2 respectively.

According to the present invention, the malfunction judgment of the oil temperature sensor 4 is made based on the oil temperature increased both in the torque converter and the shift gear mechanism.

Where a coast condition in which the slip amount between the pump and the turbine in the torque converter is relatively small is established quickly after starting, the oil temperature increase is not substantial resulting in an erroneous holding of the malfunction of the oil temperature sensor. In view of this, a cumulative time period when the idle switch is ON during the predetermined time period C1 by means of the counter CN1. According to the illustrated embodiment, the coast condition is detected based on the cumulative time period of the ON time of the idle switch. When the coast condition is detected, the flag F1 is reset to prohibit the malfunction judgment. Similarly, a cumulative time period when the idle switch is ON during the predetermined time period C2 by means of the counter CN2. The coast condition is detected based on the cumulative time period of the ON time of the idle switch. When the coast condition is detected, the flag F2 is reset to prohibit the malfunction judgment. Thus, in the illustrated embodiment, the malfunction judgment is prohibited to improve the accuracy and the reliability of the malfunction judgment.

The oil temperature increase in the torque converter under the lower vehicle speed condition is smaller than that in the shift gear mechanism under the higher vehicle speed condition. In view of this, the time period C1 is set greater than the time period C2 to improve the reliability and accuracy of the malfunction judgment.

As shown in steps SS7–SS15, when either one of the time period C1 or C2 is counted out, the other is reset and counted again. As clearly shown in FIG. 9, a higher vehicle speed condition is established quickly on starting, the time periods C1 and C2 are concurrently counted. In this case, the oil temperature increase is relatively small compared with a running condition where the time periods C1 and C2 are not concurrently counted. Therefore, the accuracy and reliability can be obtained by resetting and counting again the other again when one of the time periods C1 and C2 is counted out.

Hereinafter, there is described further embodiment of the malfunction judgment control.

In this embodiment, the plurality of malfunction judgment conditions are provided corresponding to a plurality of different running conditions.

As examples of the different running conditions, a lock-up condition where the lock-up clutch is engaged and a non lock-up condition where the lock-up clutch is not engaged are chosen. A shift control map for controlling the automatic transmission includes a lock-up engaging line and a lock-up releasing line. In order to make the lock-up control taking account of the lock-up engaging zone and the lock-up releasing zone, the oil temperature, vehicle speed V and throttle opening TVO detected by the throttle opening sensor 6 are employed. Thus, the oil temperature is important for the lock-up control.

Hereinafter, the malfunction judgment control is explained taking reference with FIGS. 7 and 8.

As the ignition switch 10 is turned on to start the control, initial setting is first performed (SS20). In this step, an initial value C0 (for example, 180 sec) is set and the timer TM is started and all the flags FF, FG3, FG4, F3 and F4 are reset. Then, the oil temperature T detected is read in and the maximum oil temperature Tmax and minimum oil temperature Tmin is set. The timers CD3 and CD4 are cleared. Next, the vehicle speed V detected by the vehicle speed sensor 6 and the oil temperature T detected by the oil temperature sensor 4 are read in (SS21), it is judged whether or not the time period C0 set for the timer TM has passed (SS22).

When the judgement in the step SS22 is No, the steps SS21 and SS22 are repeated. However, if the judgment in the step SS22 is turned Yes, the minimum oil temperature Tmin and the maximum oil temperature Tmax are renewed if necessary in step SS4. Namely, the oil temperature T is smaller than the minimum value Tmin, the minimum value Tmin is replaced by the oil temperature T. When the oil temperature T is greater than the maximum value Tmax, the value Tmax is replaced by the oil temperature T. Next, in step SS24, in case of the flag FG1=0 in the non lock-up condition, the flag FG3 is set and the timer CD3 is set at a predetermined value C3 and started counting. Similarly, in case of the flag FG4=0 in the lock-up condition, the flag FG4 is set and the timer CD4 is set at a predetermined value C4 and started counting.

Next, in step SS25, the flag FG3 is reset in the lock-up condition. Similarly, the flag FG4 is reset in the non lock-up condition. Next, in step SS27, it is judged whether or not FG3=1 and the time count for the timer CD3 is completed. In case of Yes in the judgment of step SS26, the judgment admission flag F3 is set in step SS27. Thereafter, the step SS30 is executed. On the other hand, where the judgment in step SS26 is No, it is judged whether or not the timer CD4 is counted out and the flag FG4=1 in step SS28. Where the judgment in step SS28 is Yes, the admission flag F4 is set and the procedure is forwarded to the step SS30. Where the judgment in step SS28 is No, the procedure is transferred to the step SS30 as well.

Next, in step SS30, it is judged whether or not the flag F3 is "1". If the judgment is Yes, the procedure is forwarded to the step SS32. On the other hand, the judgment is No, it is judged whether or not the flag F3 is "1". If the judgment is Yes, the step SS32 is executed. If No, the procedure is returned to the step SS21 and repeated.

In step SS32, it is judged whether or not the difference between the maximum value Tmax and the minimum value is not greater than a predetermined value $\Delta T0$ (for example 2° C.) in step SS32. Where the oil temperature sensor works properly, the oil temperature is gradually increased to increase the difference (Tmax−Tmin). However, if the oil temperature sensor 4 is malfunctioned, the indication of the oil temperature is not changed to be the difference (Tmax−Tmin)$\leq$ the predetermined value $\Delta T0$.

Thus, where the judgment in step SS32 is No, the oil temperature sensor 4 is normal so that the fail flag FF is reset in step SS33 and the procedure is returned to the step SS21 and repeated. Where the judgment in step SS32 is Yes, the fail safe flag FF is set in step SS34 and a malfunction code for indicating the malfunction of the oil temperature sensor is stored in the malfunction information memory of RAM. Next, "malfunction of the oil temperature sensor" is displayed in the indicator 8 to inform the driver of the malfunction of the oil temperature sensor 4. Then, the procedure is returned to step SS21 and repeated. Meanwhile, the malfunction judgment control is continued until the ignition switch is turned off. However, if the oil temperature sensor 4 is malfunctioned, the step 35 may be repeated without returning to the step SS21.

In the illustrated malfunction judgment control, the flag F3 is set when the vehicle runs in the non-lock-up condition for the predetermined time period C3. The flag F4 is set when the vehicle runs in the lock-up condition for the predetermined time period C4. Meanwhile, the value C3 is smaller than the value C4 since the oil temperature increase in torque converter in the non lock-up control is greater than that in the lock-up condition. Where the flag F3 or F4 is set, the malfunction is judged through the judgment in step SS32. As aforementioned, the malfunction judgment of the oil temperature sensor 4 is judged in accordance with the running condition to improve the accuracy and the reliability of the malfunction judgment.

Hereinafter, there is described further embodiment of the malfunction judgment control.

In the illustrated embodiment, the malfunction of the oil temperature sensor is judged based on the temperature increase of the indication of the oil temperature sensor after running with the predetermined vehicle speed V1 for a predetermined time period. The predetermined time period for the malfunction judgment is set at a relatively longer value in the coast condition where the vehicle is in a speed reduction running, or down hill running, due to the fact that the there is produced no substantial slip between the pump and turbine in the coast condition and thus no substantial oil temperature increase. On the other hand, the predetermined time period is set at a relatively shorter value in non coast condition, because there is produced a substantial oil temperature increase in the non coast condition.

Hereinafter, the malfunction judgment control is explained taking reference with FIGS. 11 and 12.

As the ignition switch 10 is turned on to start the control, initial setting is first performed (SS30). In this step, an initial value C0 (for example, 180 sec) is set and the timer TM is started and all the flags FF and FG are reset and the timer CD is cleared. Then, the oil temperature T detected is read in and the maximum oil temperature Tmax and minimum oil temperature Tmin is set.

Next, the vehicle speed V detected by the vehicle speed sensor 6 and the oil temperature T detected by the oil temperature sensor 4 are read in (SS31), it is judged whether or not the time period C0 set for the timer TM has passed (SS32).

When the judgement in the step SS32 is No, the steps SS31 and SS32 are repeated. However, if the judgment in the step SS32 is turned to Yes, the minimum oil temperature Tmin and the maximum oil temperature Tmax are renewed if necessary in step S33. Namely, the oil temperature T is smaller than the minimum value Tmin, the minimum value Tmin is replaced by the oil temperature T. When the oil temperature T is greater than the maximum value Tmax, the value Tmax is replaced by the oil temperature T. Next, in step SS34, it is judged whether or not the vehicle speed V$\geq$V1 (for example, 25 Km/h), the flag FG=0, and the vehicle is in the coast condition. In this case, as shown in FIG. 8, the coast condition is held when the vehicle running condition is in an area under no load line in a map using the vehicle speed and the throttle opening TVO as parameters.

If the judgment in the step SS34 is Yes, the flag FG is set in step SS35 and a predetermined time period K01 is assigned to the timer CD and counting thereof is started. Where the judgment in the step SS36, it is judged whether or not the vehicle speed V$\geq$ the predetermined vehicle speed V1 and the flag FG=0 and the vehicle is in the non coast condition. If the judgment is Yes, the flag FG is set and a predetermined time period K02 is set for the timer CD and the counting thereof is started. In this case, the value K01 is greater than the value K02 (for example, two times).

Next, it is judged whether or not the vehicle speed V< the predetermined value V1 in step SS38. If the judgment is Yes, the flag FG is reset. In case of the vehicle speed V$\geq$ the predetermined vehicle speed V1, the value of the flag FG is not changed. Next, in the step SS40, it is judged if the flag FG=1 and the count value CD=0. If the judgment is No, the procedure is returned to the step SS31 and the steps after the steps SS33 are repeated. When the judgment in step SS40 is turned to Yes as time goes on, it is judged if the difference between the values Tmax and Tmin is not greater than the predetermined value $\Delta T0$ (for example 5° C.).

Where the oil temperature sensor works properly, the oil temperature is gradually increased to increase the difference (Tmax−Tmin). However, if the oil temperature sensor 4 is malfunctioned, the indication of the oil temperature is not changed to be the difference (Tmax−Tmin)$\geq$ the predetermined value $\Delta T0$.

Thus, where the judgment in step SS32 is No, the oil temperature sensor 4 is normal so that the fail flag FF is reset in step S31 and the procedure is returned to the step SS21 and repeated. Where the judgment in step SS41 is Yes, the fail safe flag FF is set in step SS42 and a malfunction code for indicating the malfunction of the oil temperature sensor is stored in the malfunction information memory of RAM. Next, "malfunction of the oil temperature sensor" is displayed in the indicator 8 to inform the driver of the malfunction of the oil temperature sensor 4 in step SS43. Then, the procedure is returned to step SS31 and repeated. Meanwhile, the malfunction judgment control is continued until the ignition switch is turned off. However, if the oil temperature sensor 4 is malfunctioned, the step SS44 may be repeated without returning to the step SS21. The illustrated malfunction judgment control is an interrupt routine, and is executed with a predetermined small interval.

In the illustrated control, the predetermined time period K02 is set for the timer CD for counting the running time period with not smaller than the predetermined time period, and started counting in the non coast condition. In the coast condition, the predetermined time period K01 longer than the value K02 is set to make the judgment of the step SS41 after such a relatively longer time period K01 passes. Thus, the accuracy and the reliability of the malfunction judgment control can be improved. This is because the oil temperature increase is relatively small in the coast condition where there is produced no substantial slip between the pump and turbine of the torque converter and thus the value K01 is set at such a value greater than the value K02. The holding error of the malfunction of the oil temperature sensor can be effectively avoided.

Hereinafter, still another embodiment of the malfunction judgment control is explained.

Figure 14:
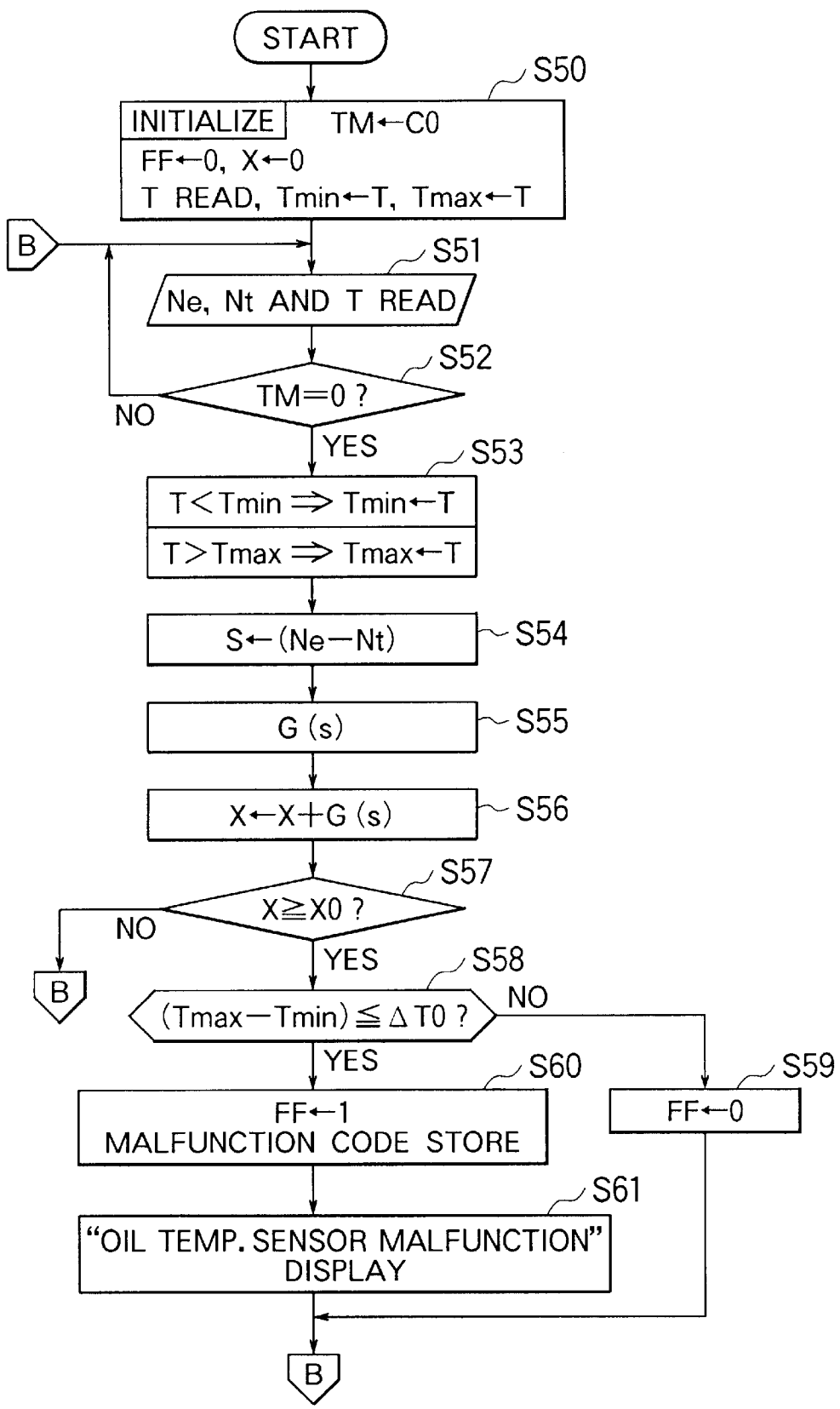
FIG. 14 is a flow chart of a malfunction judgment control in accordance with a still further embodiment of the present invention.

As shown in FIG. 14, in addition to the structure shown in FIG. 1, further provided are an engine speed sensor 11 for detecting an engine speed, turbine speed sensor 12 for sensing a turbine speed of the automatic transmission. Signals therefrom are introduced to the control unit 3 as well.

Next, further embodiment of the malfunction judgment of the oil temperature sensor will be described.

As the ignition switch 10 is turned on to start the control, initial setting is first performed (SS50). In this step, an initial value C0 (for example, 180 sec) is set and the timer TM is started and all the flags FF is reset. The cumulative slip parameter X is reset. Then, the oil temperature T detected is read in and the maximum oil temperature Tmax and minimum oil temperature Tmin is set.

Next, the engine speed Ne, turbine speed Nt, and the oil temperature T are read in (S51). Next, it is judged whether or not the time period C0 set for the timer TM has passed (S52).

When the judgement in the step S52 is No, the steps S51 and S52 are repeated. However, if the judgment in the step S52 is turned Yes, the minimum oil temperature Tmin and the maximum oil temperature Tmax are renewed if necessary in step S53. Namely, the oil temperature T is smaller than the minimum value Tmin, the minimum value Tmin is replaced by the oil temperature T. When the oil temperature T is greater than the maximum value Tmax, the value Tmax is replaced by the oil temperature T.

Next, the slip amount s corresponding to the slip between the pump and turbine of the transmission 2 is calculated as a difference (Ne−Nt) between the engine speed Ne and the turbine speed Nt. Next, an increment of cumulative parameter G(s) is calculated (S55) in light of the map shown in FIG. 15. Then, the cumulative slip parameter X is calculated as a sum of the increment G(s) of the current cycle and the cumulative parameter X in the precedent cycle (S56). The cumulative parameter X is a parameter denoting a degree of a slippage amount between the pump and turbine of the transmission 2. When the slip between the pump and turbine is small, the cumulative slip parameter X is small.

Next, it is judged whether or not the cumulative slip parameter X is not smaller than a predetermined value X0. When the judgment is No, the procedure is returned to the step S51. As the step 51 is repeated, the cumulative slip parameter X is increased. When the cumulative slip parameter X exceeds the predetermined value X0, the procedure is transferred to step S58 in which it is judged whether or not the increment (Tmax−Tmin) of the oil temperature is not greater than a predetermined value $\Delta T0$ (for example 5° C.). While the oil temperature sensor works properly, the oil temperature is gradually increased to increase the difference (Tmax−Tmin). However, if the oil temperature sensor 4 is malfunctioned, the indication of the oil temperature is not changed to be the difference (Tmax−Tmin)$\leq$ the predetermined value $\Delta T0$.

Thus, where the judgment in step S58 is No, the oil temperature sensor 4 is normal so that the fail flag FF is reset in step S59 and the procedure is returned to the step S51 and repeated. Where the judgment in step S58 is Yes, the fail safe flag FF is set in step S60 and a malfunction code for indicating the malfunction of the oil temperature sensor is stored in the malfunction information memory of RAM. Next, "malfunction of the oil temperature sensor" is displayed in the indicator 8 to inform the driver of the malfunction of the oil temperature sensor 4 in step S61. Then, the procedure is returned to step S51 and the steps are repeated. Meanwhile, the malfunction judgment control is continued until the ignition switch is turned off. However, if the oil temperature sensor 4 is malfunctioned, the step S61 may be repeated without returning to the step S51. The malfunction judgment control is executed with a predetermined small interval as an interrupt routine.

In the illustrated malfunction judgment control, the cumulative slip parameter X which reflects a degree of the slip amount between the pump and turbine is introduced considering that the oil temperature increase is relatively enhanced as the slip amount is remarkable. As stated above, the judgment is made as to whether or not the increment (Tmax−Tmin) of the oil temperature is not greater than the predetermined value $\Delta T0$ after the cumulative slip parameter X reaches the predetermined value X0. Thus, when the slip amount is relatively small and thus the oil temperature increase is relatively small, the time period to reach the predetermined value X0 is increased to improve the accuracy and reliability of the malfunction judgment.

The following modifications can be made.

1) In the embodiment of FIGS. 9 and 10, the threshold $\Delta T0$ may be set at a smaller value after the flag F1 is set in case of CN1$\geq$K1 in step SS17. The threshold $\Delta T0$ may be set at a smaller value after the flag F1 is set in case of CN1$\geq$K1 in step SS17 as well. When the value $\Delta T0$ is changed to a smaller value, the execution of the malfunction judgment is restrictive. As a result, the erroneous judgment of the malfunction of the oil temperature sensor 4 is effectively suppressed.

Figure 13:
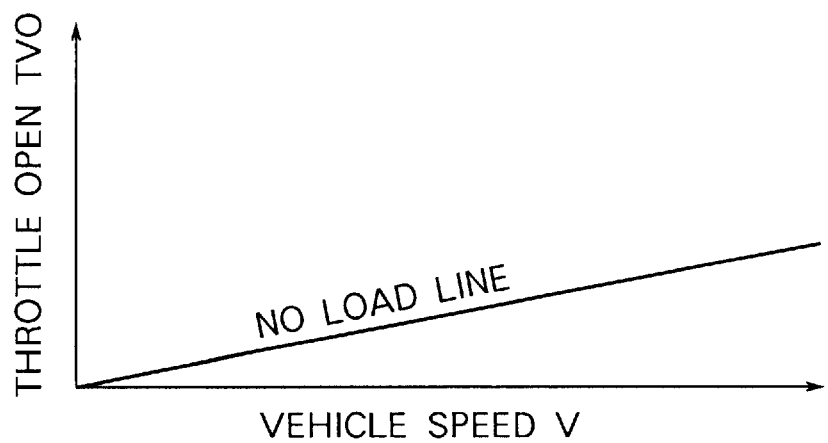
FIG. 13 is a graphical representation showing a no load line in connection with a throttle opening and the vehicle speed.

2) In the embodiment of FIGS. 9 and 10, the condition that the idle switch is ON in step SS6 may be replaced by the condition that the running condition is a coast condition. In this case, the coast condition is determined based on the map shown in FIG. 13.

Figure 11:
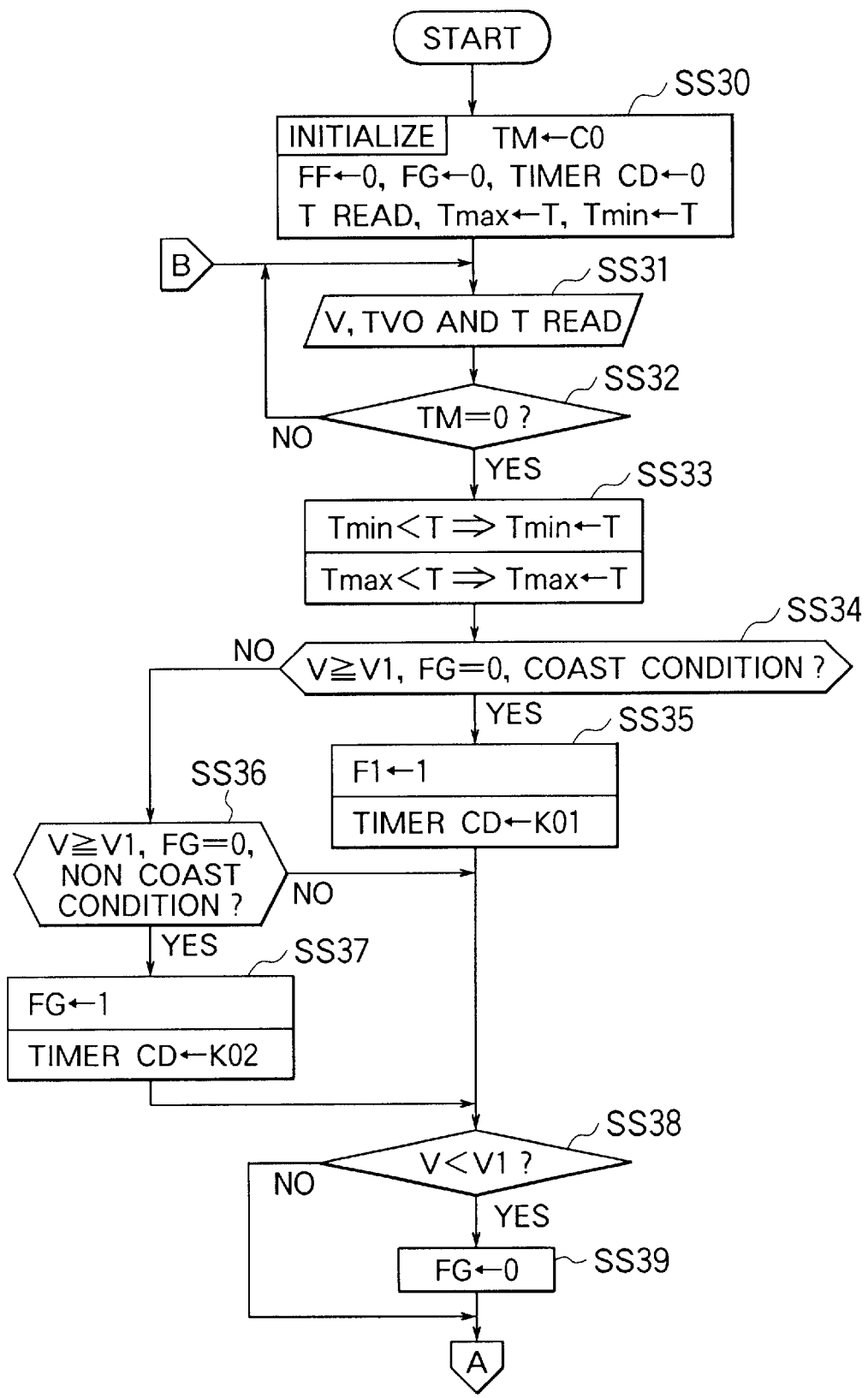
FIG. 11 is a flow chart of a malfunction judgment control in accordance with a still further embodiment of the present invention.
Figure 12:
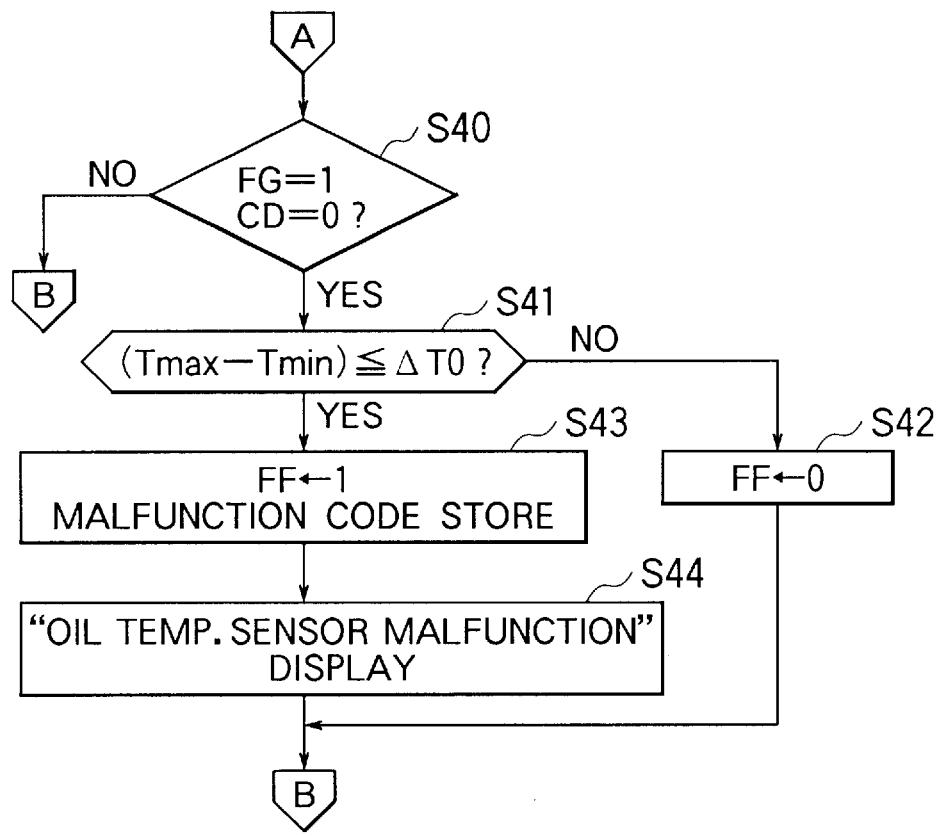
FIG. 12 is a flow chart continued from FIG. 11.

3) In the embodiment of FIGS. 11 and 12, although the predetermined time periods K01 and K02 are set to have different values, they can be set to have the same value and a smaller value ΔT0 can be set in step SS42 when the running condition of the vehicle is in the coast condition.

Figure 15:
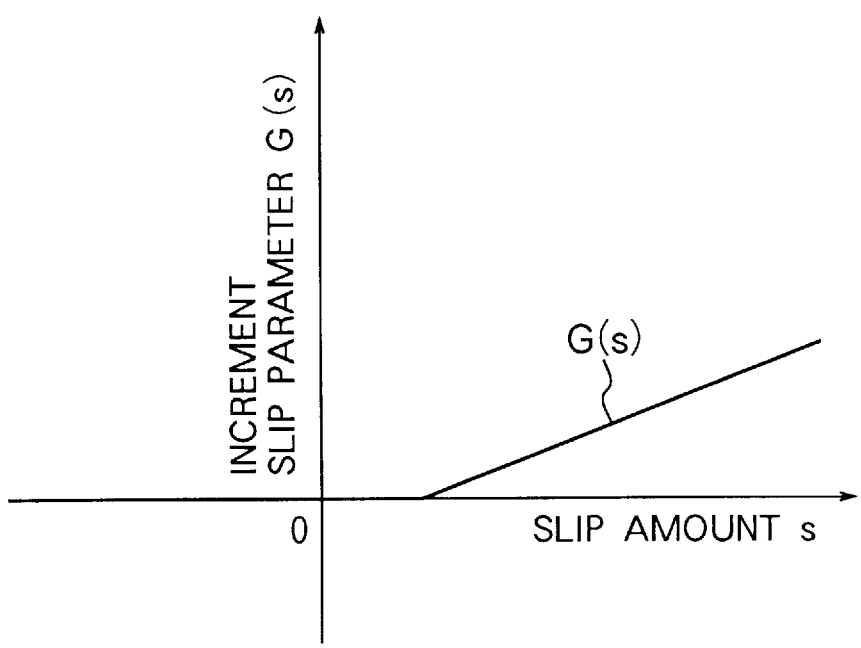
FIG. 15 is a graphical representation showing a relationship between the cumulative slip amount and the slip amount.

4) In the embodiment of FIG. 15, the malfunction judgment control from the steps 54–56 may be executed only when the vehicle speed is not smaller than the value V1.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A malfunction judgment system of an oil temperature sensor for detecting a hydraulic oil temperature filled in an automatic transmission of a vehicle which includes a torque converter connected with a power source and a shift gear mechanism connected with the torque converter, comprising;

malfunction judgment means for receiving an output of the oil temperature sensor to judge a malfunction of the oil temperature sensor where an increase rate of the oil temperature is smaller than a predetermined value in a predetermined period after the vehicle starts running, running condition detecting means for detecting a vehicle running condition, and;

the malfunction judgment means being provided with a plurality of malfunction judgment conditions for judging the malfunction of the oil temperature sensor in accordance with the running condition of the vehicle.

2. A malfunction judgment system as recited in claim 1 further comprising a lock-up clutch for directly connecting an input and output members of the torque converter, and lock-up control means for controlling an engagement of the lock-up clutch between a lock-up condition where the input member is engaged with the output member and a non lock-up condition where the input member is not engaged with the output member wherein the malfunction judgment conditions are different between the lock up condition and the non lock-up condition.

3. A malfunction judgment system as recited in claim 2 wherein the malfunction judgment means is less sensitive to hold the malfunction of the oil temperature judgment in the lock up condition than in the non-lock up condition.

4. A malfunction judgment system as recited in claim 1 further comprising a torque converter connected with the shift gear mechanism, and, the malfunction judgment means being provided with a plurality of malfunction judgment conditions in accordance with a slip amount between an input and output members of the torque converter.

5. A malfunction judgment system as recited in claim 4 wherein the malfunction judgment means become less sensitive to find the malfunction of the oil temperature sensor as the slip amount is reduced.

6. A malfunction judgment system as recited in claim 5 wherein the malfunction judgment means is less sensitive to find the malfunction of the oil temperature in a coast condition in which the slip amount is smaller than a predetermined value.

7. A malfunction judgment system as recited in claim 5 wherein the coast condition is a no load condition in which the power source drives no wheel of the vehicle, the malfunction judgment means being less sensitive in judging the malfunction of the oil temperature sensor when the no load condition is detected.

8. A malfunction judgment system as recited in claim 6 wherein the malfunction judgment means detects the coast condition based on the slip amount of the lock-up clutch.

9. A malfunction judgment system as recited in claim 6 further comprising an acceleration pedal for changing an engine load in accordance with its operation stroke, an idle switch which is turned on where the acceleration pedal is not operated, and the malfunction judgment means detecting the coast condition where a cumulative time period for which the idle switch has been kept on is greater than a predetermined value.

10. A malfunction judgment system as recited in claim 6 wherein the running condition detecting means detects the vehicle speed and the engine load, and wherein the malfunction judgment means detect the coast condition based on the vehicle speed and the engine load.

11. A malfunction judgment system as recited in claim 1 wherein the malfunction judgment means judges the malfunction of the oil temperature sensor based on an oil temperature increase of the automatic transmission after running for a predetermined period with a vehicle speed greater than a predetermined value.

12. A malfunction judgment system as recited in claim 6 wherein the malfunction judgment means judges the malfunction of the oil temperature sensor based on the oil temperature increase after running for a predetermined time period with a vehicle speed, and the predetermined time period being increased in the coast condition.

13. A malfunction judgment system as recited in claim 6 wherein the malfunction judgment means holds the malfunction of the oil temperature sensor when the temperature increase is not greater than a predetermined value after running for a predetermined time period with a vehicle speed greater than a predetermined vehicle speed, and the predetermined value of the oil temperature increase being decreased in the coast condition.

14. A malfunction judgment system as recited in claim 6 wherein the malfunction judgment means is prohibited to make a judgment of the malfunction of the oil temperature sensor in the coast condition.

15. A malfunction judgment system as recited in claim 1 further comprising informing means for informing a driver of the malfunction of the oil temperature sensor.

16. A malfunction judgment system as recited in claim 1 further comprising a storage which stores information of the malfunction of the oil temperature sensor.

17. A malfunction judgment system as recited in claim 1 wherein the malfunction judgment means holds the malfunction of the oil temperature sensor when the temperature increase as indicated is smaller than a predetermined value after running with a first predetermined vehicle speed for a first predetermined time period and after running with a second predetermined vehicle speed which is different from the first predetermined vehicle speed for a second predetermined time period which is deferent from the first predetermined time period.

18. A malfunction judgment system as recited in claim 17 wherein the automatic transmission comprises a torque converter connected with a power source and a shift gear mechanism connected with the torque converter, and, wherein the first predetermined vehicle speed is determined to have a greater oil temperature increase in a shift gear mechanism than that in the torque convertor and the second predetermined vehicle speed is determined to have a greater oil temperature in the torque converter than in the shift gear mechanism.

19. A malfunction judgment system as recited in claim 18 wherein the second predetermined time period is greater than the first predetermined time period.

20. A malfunction judgment system as recited in claim 19 wherein a timer for counting the second predetermined time period is reset when the first predetermined time period passes during the counting of the second predetermined time period.

21. A malfunction judgment system as recited in claim 20 wherein the oil temperature increase is obtained after running with the first predetermined vehicle speed for the first predetermined time period and with the second predetermined vehicle speed for the second predetermined period.

22. A malfunction judgment system as recited in claim 1 wherein the malfunction judgment means starts to judge the malfunction of the oil temperature sensor a predetermined time period after the start of the power source.

23. A malfunction judgment system as recited in claim 22 wherein the predetermined time period is determined based on an amount of the hydraulic oil in the automatic transmission.

* * * * *